US011966387B2

(12) United States Patent
Jiang et al.

(10) Patent No.: US 11,966,387 B2
(45) Date of Patent: Apr. 23, 2024

(54) DATA INGESTION TO AVOID CONGESTION IN NoSQL DATABASES

(71) Applicant: INTERNATIONAL BUSINESS MACHINES CORPORATION, Armonk, NY (US)

(72) Inventors: Peng Hui Jiang, Beijing (CN); Jun Su, Beijing (CN); Guang Han Sui, Beijing (CN); Di Li Hu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/933,635

(22) Filed: Sep. 20, 2022

(65) Prior Publication Data

US 2024/0095234 A1 Mar. 21, 2024

(51) Int. Cl.
*G06F 16/00* (2019.01)
*G06F 16/23* (2019.01)

(52) U.S. Cl.
CPC ................ *G06F 16/2379* (2019.01)

(58) Field of Classification Search
None
See application file for complete search history.

(56) References Cited

U.S. PATENT DOCUMENTS

| 9,489,443 | B1 | 11/2016 | Muniswamy-Reddy |
| 10,268,726 | B1 | 4/2019 | Schiesser |
| 10,552,556 | B2 | 2/2020 | Kikinis |
| 11,762,860 | B1* | 9/2023 | Rahman ............ G06F 16/24539 707/769 |
| 2018/0196867 | A1* | 7/2018 | Wiesmaier ............ G06F 9/5038 |
| 2018/0203744 | A1* | 7/2018 | Wiesmaier ............ G06F 9/505 |
| 2019/0138641 | A1* | 5/2019 | Pal ........................ G06F 16/27 |
| 2019/0258637 | A1* | 8/2019 | Bhattacharjee ... G06F 16/24549 |
| 2020/0134081 | A1 | 4/2020 | Ho |
| 2021/0026980 | A1* | 1/2021 | Candelario ............ G06F 21/64 |
| 2021/0042386 | A1* | 2/2021 | Chou ..................... G06F 16/901 |

(Continued)

OTHER PUBLICATIONS

D'Alconzo, A., Drago, I., Morichetta, A., Mellia, M., & Casas, P. (2019). A survey on big data for network traffic monitoring and analysis. IEEE Transactions on Network and Service Management, 16(3), 800-813. (Year: 2019).*

(Continued)

*Primary Examiner* — Farhan M Syed
(74) *Attorney, Agent, or Firm* — Teddi E. Maranzano (57) ABSTRACT

Method, computer program product, and computer system are provided. Traffic is collected against a NoSQL database by an activity collector. A database transaction log is periodically extracted and analyzed. The collected traffic and the analyzed database transaction log are input to building a knowledge base of database access patterns. Current traffic is captured and used to compute an activity threshold. Traffic is directed to a workload processor based on the activity threshold. Traffic is directed to an intensive insert/update/delete (IUD) processor in response to the activity threshold exceeding a configured threshold. A plurality of temporary shards is generated along with an adaptive key and adaptive index in the plurality of temporary shards. The intensive IUD processor traffic is re-directed to the plurality of temporary shards while the activity threshold exceeds the configured threshold.

20 Claims, 7 Drawing Sheets

(56) References Cited

U.S. PATENT DOCUMENTS

| | | | | |
|---|---|---|---|---|
| 2021/0042387 | A1* | 2/2021 | Chou | G06F 40/205 |
| 2021/0042389 | A1* | 2/2021 | Chou | G06F 40/279 |
| 2021/0132846 | A1* | 5/2021 | Moldvai | G06F 3/0671 |
| 2021/0133031 | A1* | 5/2021 | Moldvai | G06F 11/1435 |
| 2021/0133035 | A1* | 5/2021 | Moldvai | G06F 11/1484 |
| 2023/0252176 | A1* | 8/2023 | Candelario | G16H 10/60 |
| | | | | 726/27 |

OTHER PUBLICATIONS

De Oliveira, Rafael Cardoso. "Near real-time network analysis for the identification of malicious activity." PhD diss., Instituto Politecnico de Braganca (Portugal), 2021. (Year: 2021).*

Author Unknown, "Best Practices for Designing and Using Partition Keys Effectively," Amazon DynamoDB [online], [accessed on Jun. 10, 2022], 2 pages, Retrieved from the Internet: <URL: https://docs.aws.amazon.com/amazondynamodb/latest/developerguide/bp-partition-key-design.html>.

Author Unknown, "Designing Partition Keys to Distribute Your Workload Evenly," Amazon DynamoDB [online], [accessing Jun. 10, 2022], 1 page, Retrieved from the Internet: <URL: https://docs.aws.amazon.com/amazondynamodb/latest/developerguide/bp-partition-key-uniform-load.html>.

Balasubramanian, et al., "Choosing the Right DynamoDB Partition Key," Amazon DynamoDB, Database [blog], Feb. 20, 2017 [Jun. 10, 2022], 4 pages, Retrieved from the Internet: <URL: https://aws.amazon.com/blogs/database/choosing-the-right-dynamodb-partition-key/>.

Olma, et al., "Adaptive partitioning and indexing for in situ query processing," The VLDB Journal [special issue paper], 2019, pp. 569-591, vol. 29, Issue 1, DOI: 10.1007/s00778-019-00580-x, Retrieved from the Internet: <URL: https://link.springer.com/article/10.1007/s00778-019-00580-x>.

* cited by examiner

DATA INGESTION TO AVOID CONGESTION IN NoSQL DATABASES

BACKGROUND

The present invention relates to computer systems, and more specifically to avoiding congestion in NoSQL databases.

NoSQL databases, unlike relational databases, are non-tabular in that they do not use schemas of rows and columns. Non-relational databases use a storage model that is optimized for the specific type of data being stored. Capacity in non-relational databases is extended by adding more nodes to the computer system, thereby breaking the data into more but smaller units, referred to as shards or partitions. This tends to distribute query loads across the shards, thereby increasing parallel query execution. However, the query load can be concentrated on a single shard depending on several factors, such as uneven distribution of data due to incorrect choice of primary key, or frequent access to the same key or key range in the shard.

It would be advantageous to generate an adaptive shard key to provide even distribution of data and to provide efficient performance during data queries.

SUMMARY

A method is provided. Traffic is collected against a NoSQL database by an activity collector. A database transaction log is periodically extracted and analyzed. The collected traffic and the analyzed database transaction log are input to build a knowledge base of database access patterns. Current traffic is captured and used to compute an activity threshold. Traffic is directed to a workload processor based on the activity threshold. Traffic is directed to an intensive insert/update/delete (IUD) processor in response to the activity threshold exceeding a configured threshold. A plurality of temporary shards is generated along with an adaptive key and adaptive index in the plurality of temporary shards. The intensive IUD processor traffic is re-directed to the plurality of temporary shards while the activity threshold exceeds the configured threshold.

Embodiments are further directed to computer systems and computer program products having substantially the same features as the above-described computer-implemented method.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

NoSQL databases, unlike relational databases, are non-tabular in that they do not use schemas of rows and columns. Non-relational databases use a storage model that is optimized for the specific type of data being stored. Capacity in non-relational databases is extended by adding more nodes to the computer system, thereby breaking the data into more but smaller units, referred to as shards. This tends to distribute database activity across the shards, thereby increasing parallelized execution. However, the load can be concentrated on a single shard depending on several factors, such as uneven distribution of data due to incorrect choice of primary key, or frequent access to the same key in the shard. For a query where the activity is not evenly distributed across the shards, performance can still be impacted, but not as severely as with insert/update/delete (IUD) activity. This is because IUD activity requires alterations to the NoSQL database, updating the primary keys, possibly adding disk volumes for inserted data, and introducing latency due to serialization requirements, all leading to a need to rebalance (redistribute) the data in the shards. Therefore, while query processing can be performance intensive, IUD processing is even more so.

Consider the example of a banking application that processes credit transactions against a NoSQL database. A TransDate can be defined as the primary key and can be used in the daily processing to detach a shard per day to be added to the history table, thereby simplifying maintenance. However, as a side effect transaction timeout and high wait times can occur when the TransDate value is the today's date, because of the high volume of traffic to that shard. One solution is to choose a different field as primary key. While this may improve the performance, a side effect may be to increase the complexity of the daily maintenance procedures for processing the daily shard to become history. A shard key is needed so that the shard is not so wide in range as to be meaningless, but not so narrow as to cause frequent rebalancing.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
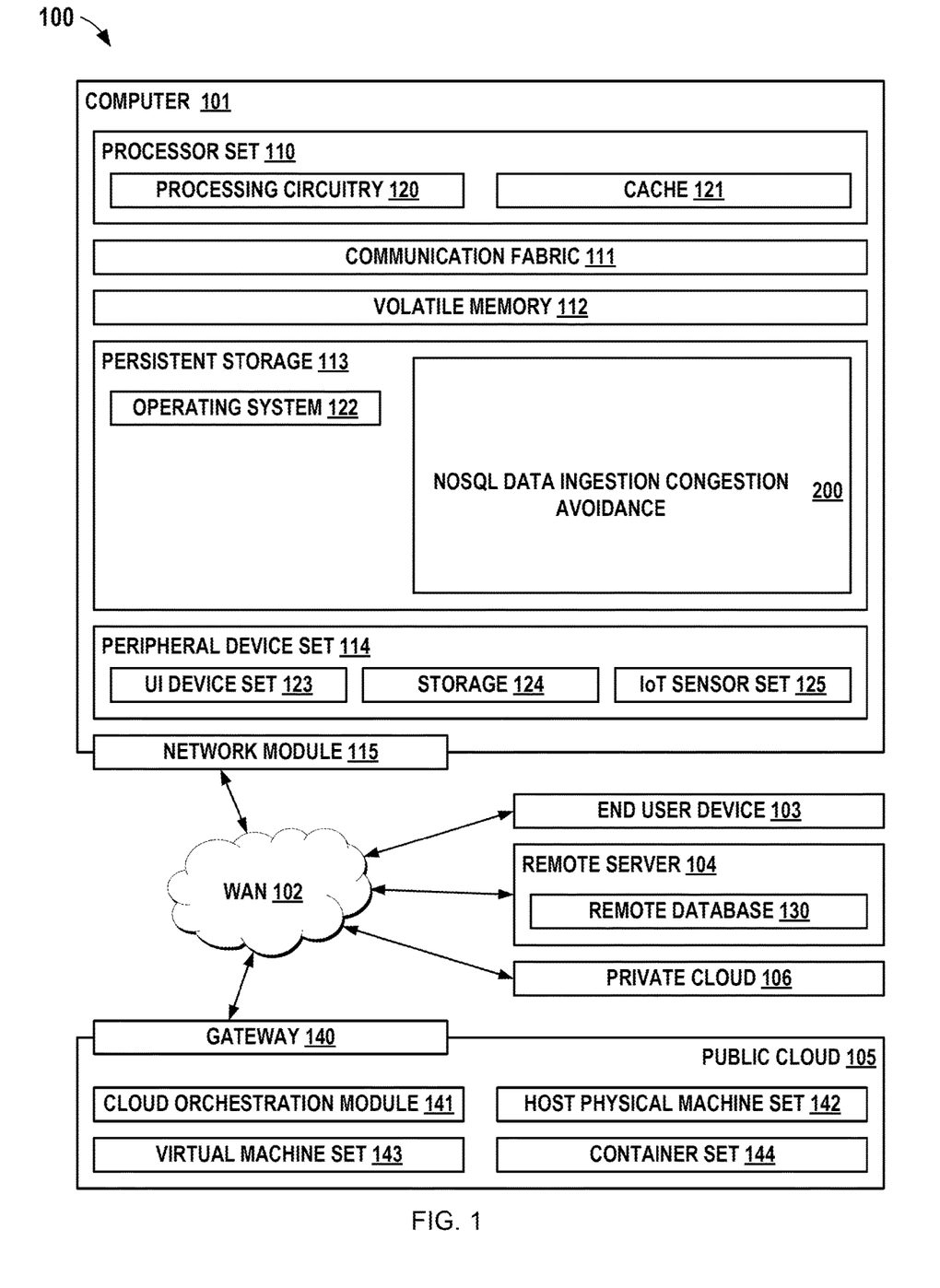
FIG. 1 illustrates the operating environment of a computer server, according to an embodiment of the present invention.

Beginning now with FIG. 1, an illustration is presented of the operating environment of a networked computer, according to an embodiment of the present invention.

Computing environment 100 contains an example of an environment for the execution of at least some of the computer code involved in performing the inventive methods, such as NoSQL data ingestion congestion avoidance (architecture) 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101.

Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, an administrator that operates computer 101), and may take any of the forms discussed above in connection with computer 101. For example, EUD 103 can be the external application by which an end user connects to the control node through WAN 102. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
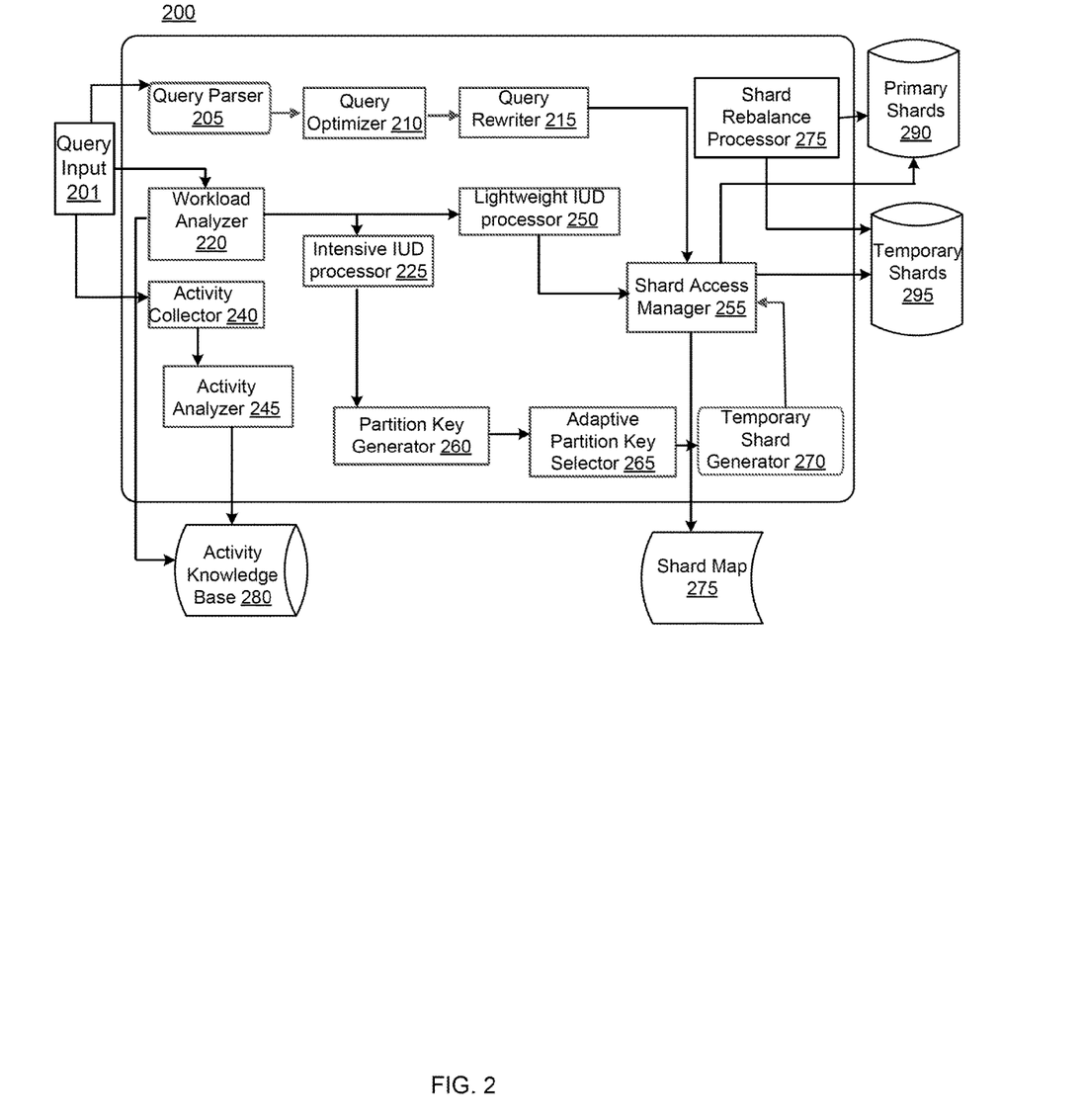
FIG. 2 illustrates exemplary program components of an architecture for NoSQL data ingestion congestion avoidance, in accordance with one or more aspects of the present invention.

FIG. 2 illustrates exemplary program components of an architecture for NoSQL data ingestion congestion avoidance (architecture) 200.

The NoSQL database engine receives a query (201) as input to the NoSQL architecture. Generally, in the art, a query refers to a request to retrieve data, as to display or for a report, or alternatively to an IUD operation. As used herein, a query refers to a request for data retrieval, whereas an operation to modify data is referred to as an IUD operation. If the query 201 is for data retrieval, the query parser 205 analyzes the query text to learn the target of the request. The query optimizer 210 receives the parsed query to determine the path that is predicted, for example using system catalog stored statistics, to be the most efficient to retrieve the data. In contrast to relational databases where a standardized SQL language exists, NoSQL language varies according to the NoSQL database vendor's design. The query rewriter 215 receives the optimized query and adjusts the query's language if needed for compatibility with the language of the NoSQL architecture. The shard access manager 255 receives the rewritten query and accesses the shard map 275. The shard map 275 includes information that the database uses to locate the data to satisfy the query.

If the query (201) is an IUD operation, it is directed to the activity collector 240. This is a server-based agent that collects and categorizes accesses to the NoSQL database shard data and to the indexes in real-time. The activity collector 240 also counts data accesses in calls to user-defined functions (UDF).

The collected information is sent to the activity analyzer 245 where it is analyzed in real-time to predict the trend of traffic against the database, and to store/update the activity knowledge base 280 with the collected information, where it is combined with historical access statistics as stored in the NoSQL database system catalog. Trend analysis involves the collection of information from multiple time periods and plotting the information for further review. The intent of this analysis is to spot actionable patterns in the presented information, such as workloads that are classified as normal, idle, and intensive.

The analysis identifies conditions such as most frequently executed IUD operations, whether there are patterns/sequences of IUD operations that occur together, a shard or a group of shards accessed together in an IUD operation, a frequently accessed database, latency (speed of access) of one or more shards, and a frequently accessed tenant in a database. The amount of time to complete an IUD operation can also be considered. Where one or more metric exceeds a preconfigured threshold, then the traffic is redirected to the intensive IUD processor 225.

Figure 3:
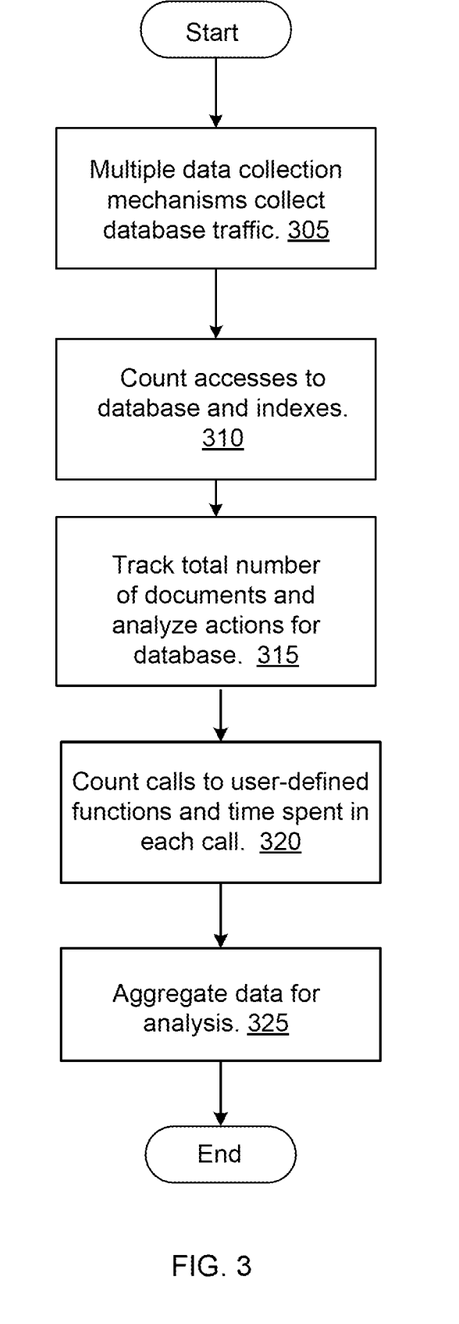
FIG. 3 illustrates a process flow for the NoSQL database activity collector, in accordance with one or more aspects of the present invention.

FIG. 3 illustrates a process flow for the NoSQL database activity collector 240.

The activity collector 240 collects traffic against the NoSQL database. The activity collector includes server-based agent software, in-line network collectors, and out-of-band network collectors. The activity collector 240 can be configured to periodically extract and analyze the database transaction log (305). Accesses to the database and to the indexes are also counted in both disk-block and individual row terms (310). The total number of documents in the database is tracked, for example, using the database log, the database catalog statistics, or other performance tools (315). The activity collector 240 collects the time spent in each call to a UDF and the number of calls to each UDF (320). The UDFs are reusable extensions to the database functionality that provide customizations to the database architecture. The collected data is available for further analysis, and is aggregated in a central location, such as the activity knowledge base 280 (325) where it is combined with historical access statistics as stored in the NoSQL database system catalog.

Figure 4:
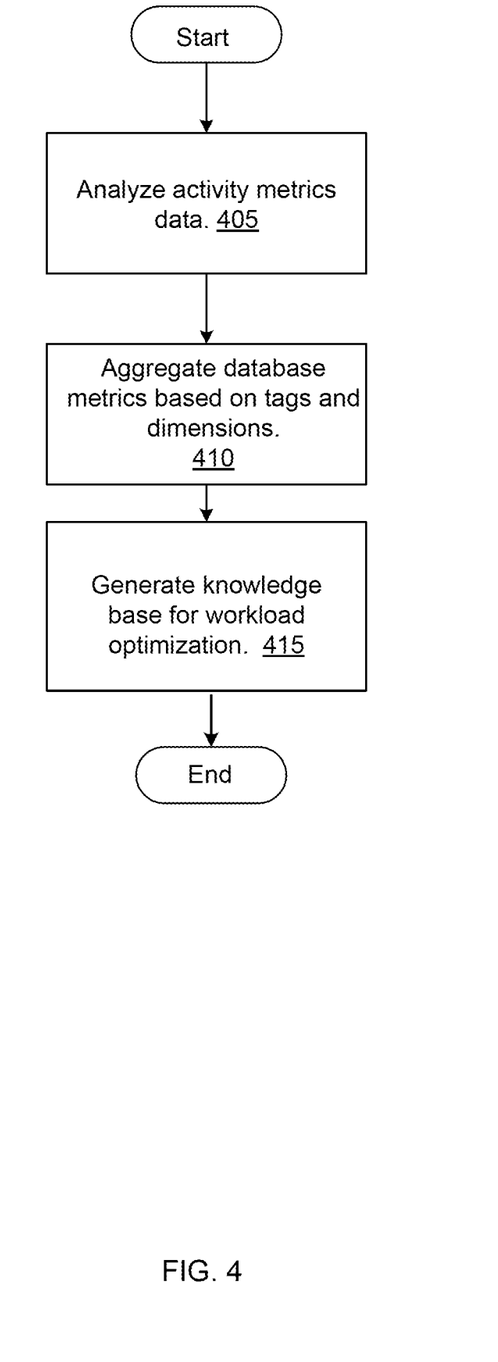
FIG. 4 illustrates a process flow for the NoSQL database activity analyzer, in accordance with one or more aspects of the present invention.

FIG. 4 illustrates a process flow for the NoSQL database activity analyzer 245. The database activity analyzer 245 aggregates the collected metrics data based on tags and dimensions, for example, Min, Max, Avg, Medium, Sum, Count, and Percentile Ranks (405, 410), as shown in the exemplary Table 1.

TABLE 1

Sample Aggregation Function metrics_name: String tag_name: String lane: String
input: { intput_parameter_1: Type intput_parameter_2: Type
 . . .
 intput_parameter_n: Type
}
output: {
 ontput_parameter_1: Type ontput_parameter_2: Type
 . . .
 ontput_parameter_n: Type
}
aggregation: String [form, tag_group, script] implementation:{
 script: String
 tag_group: String
 form: String
 value: String
}

The aggregated metrics are stored in the activity knowledge base 280 for use with query optimization and workload dispatch (415). For example, aggregated metrics are defined to identify hot shard/shard groups, hot query strings and query patterns, and in the case of multi-tenant databases, the tenant in the hot database.

Figure 5:
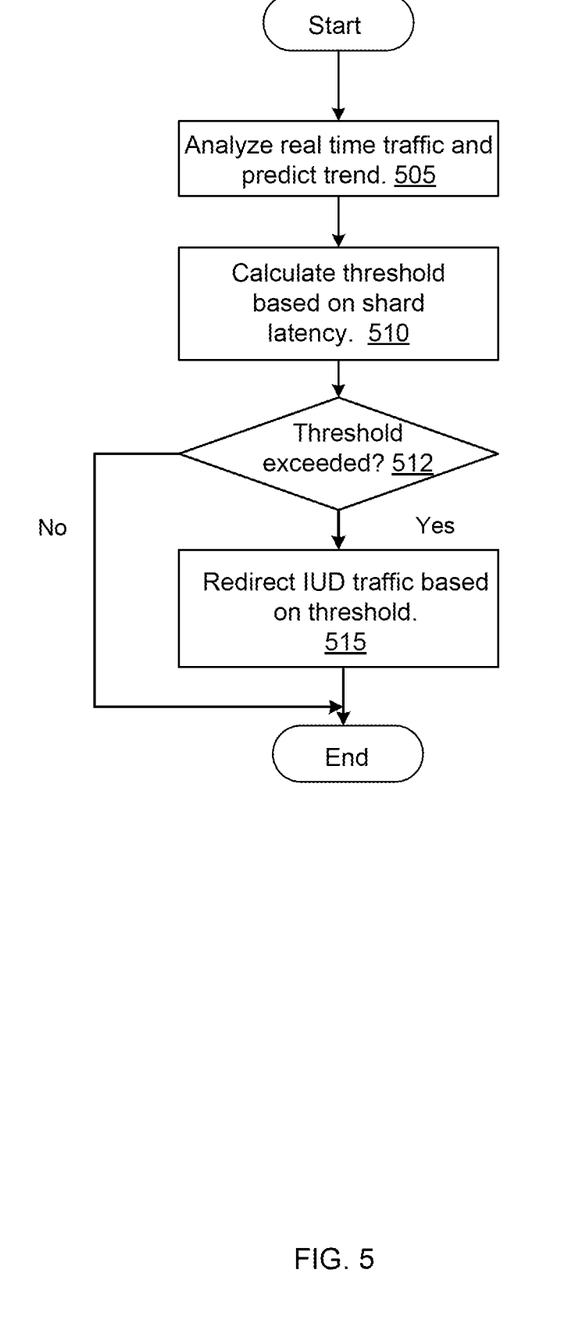
FIG. 5 illustrates a process flow for the workload analyzer, in accordance with one or more aspects of the present invention.

FIG. 5 illustrates a process flow for the workload analyzer 220.

Real time traffic is collected and analyzed to predict a trend in incoming traffic (505). The workload analyzer 220 calculates a threshold based on the latency (speed) of writes to the shards, such as a number of writes to a single shard per second (510). The intensive IUD process receives the IUD operation if the calculated threshold meets or exceeds the configurable activity threshold (512, 515). If the activity threshold is not exceeded, the IUD operation is satisfied by the database engine without going through the temporary shard creation (512).

Figure 6:
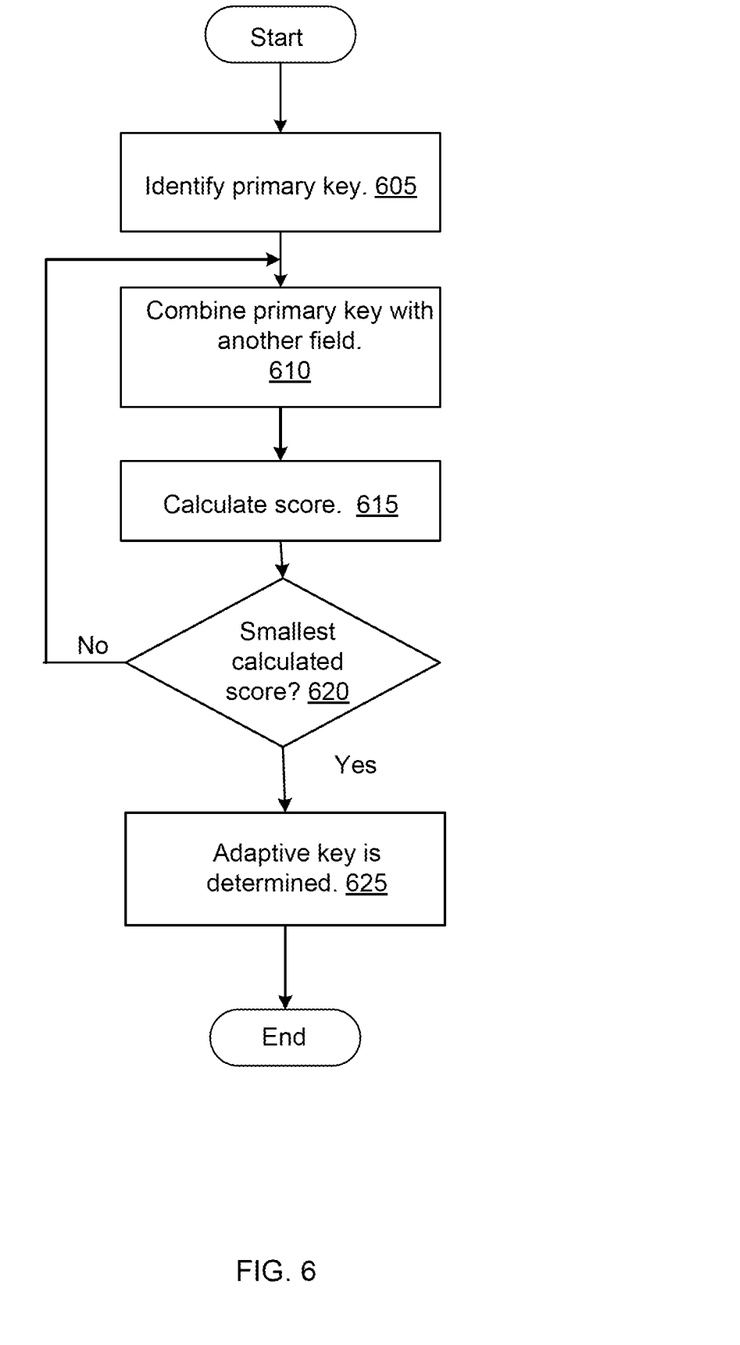
FIG. 6 illustrates a process flow for the temporary shard generator, in accordance with one or more aspects of the present invention.

FIG. 6 illustrates a process flow for the temporary shard generator 270, i.e., the intensive IUD process.

The primary key is identified (605), typically by examining the database system catalog, and is combined with another field (610) to calculate a score of the best combination of fields. The cardinality of the field entries and dispersion analysis, or other statistical calculation formula is used (615). The calculated score is compared to the calculated score of the previous combination of primary key/field. The primary key/field combination that produces the smallest score (620) is used as the adaptive key (625), otherwise the next field is combined with the primary key and the calculating/comparison continues until the last combination of primary key/field is reached.

Figure 7:
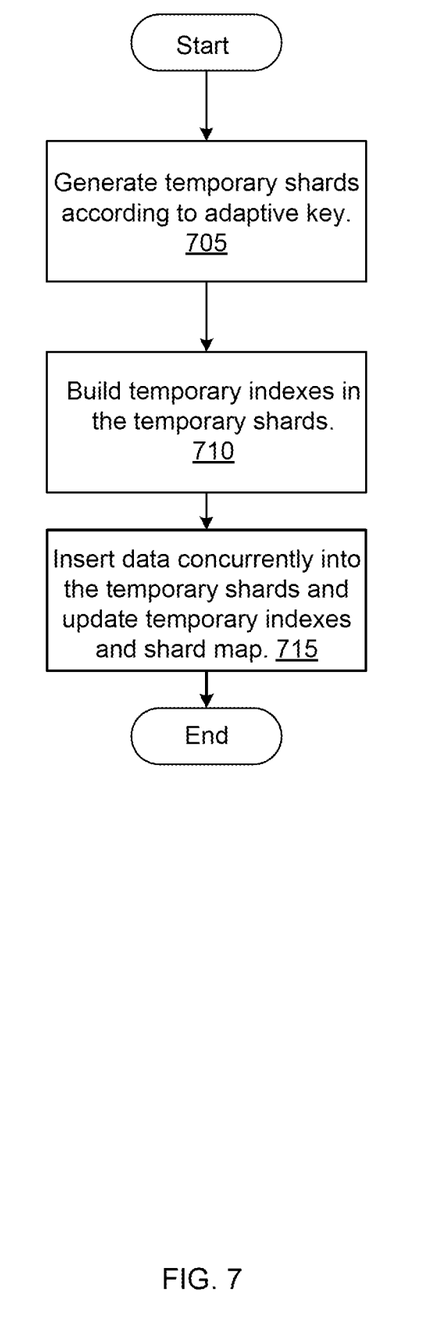
FIG. 7 illustrates a process flow for the shard access manager, in accordance with one or more aspects of the present invention.

FIG. 7 illustrates a process flow for the shard access manager 255.

The shard access manager 255 generates temporary shards using the calculated adaptive key (705). The shard access manager 255 can consider cluster-level configuration settings in determining where to create the temporary shards and the temporary indexes, which are based on the adaptive key (710). Data accesses of the IUD operation can be performed concurrently, for example, evenly distributing inserted data into the temporary shards. The indexes are updated along with the shard map 275 (715). The shard map 275 maintains global mapping information about the data and its location in the shards. The shard map 275 can be constructed using lists of individual primary key values, ranges of key values, hash based key values, or expression-based results.

Both IUD operations and queries are satisfied by accesses against both the base shard and the temporary shard because the temporary shard likely contains the most current version of the data. Over time, as the IUD operation activity falls below the configurable threshold, the shards are re-balanced. The temporary shards are merged with the base shards and then removed. Cluster-level shard allocation settings control allocation and rebalancing operations. Cluster-level shard allocation filtering allows certain nodes or groups of nodes to be excluded from allocation so that they can be decommissioned.

The collected information is sent to the activity analyzer 245 to update a knowledge base of the database access patterns, where it is combined with historical access statistics as stored in the NoSQL database system catalog. The NoSQL database log, the collected information, and the system catalog statistics are analyzed against a configurable threshold (515).

What is claimed is:

1. A method, comprising:
    collecting traffic against a NoSQL database by an activity collector, wherein the collected traffic is analyzed to predict a trend of traffic against the NoSQL database;
    periodically extracting and analyzing by an activity analyzer a database transaction log, wherein the collected traffic and the analyzed database transaction log are input to building a database access pattern, wherein data comprising the database access pattern is stored in an activity database;
    capturing, by a workload analyzer, current traffic and compute an activity threshold;
    for an intensive insert/update/delete (IUD) operation, directing the traffic to a workload processor in response to an activity threshold exceeding a configured threshold;
    based on the activity threshold exceed the configured threshold, generating a plurality of temporary shards, an adaptive key and an adaptive index in the plurality of temporary shards; and
    re-directing the intensive IUD processor traffic to the plurality of temporary shards while the activity threshold exceeds the configured threshold.

2. The method of claim 1, wherein query traffic is directed to base shards only.

3. The method of claim 1, wherein IUD traffic is directed to base shards based on the activity threshold being below the configured threshold.

4. The method of claim 1, wherein the plurality of temporary shards and the adaptive index are asynchronously merged into the base shards in a background process when the activity threshold falls below the configured threshold.

5. The method of claim 1, wherein the traffic collected includes: a most frequently executed IUD operation, patterns/sequences of IUD operations that occur together, and a shard or a group of shards that are accessed together in an IUD operation.

6. The method of claim 1, wherein the traffic is collected using server-based agent software, in-line network collectors, and out-of-band network collectors.

7. The method of claim 1, wherein time spent in calls to user defined functions (UDF) and a number of calls to each UDF are included in the activity calculation.

8. A computer program product, the computer program product comprising a non-transitory tangible storage device having program code embodied therewith, the program code executable by a processor of a computer to perform a method, the method comprising:
    collecting traffic against a NoSQL database by an activity collector, wherein the collected traffic is analyzed to predict a trend of traffic against the NoSQL database;
    periodically extracting and analyzing by an activity analyzer a database transaction log, wherein the collected traffic and the analyzed database transaction log are input to building a database access pattern, wherein data comprising the database access pattern is stored in an activity database;
    capturing, by a workload analyzer, current traffic and compute an activity threshold;
    for an intensive insert/update/delete (IUD) operation, directing the traffic to a workload processor in response to an activity threshold exceeding a configured threshold;
    based on the activity threshold exceed the configured threshold, generating a plurality of temporary shards, an adaptive key and an adaptive index in the plurality of temporary shards; and
    re-directing the intensive IUD processor traffic to the plurality of temporary shards while the activity threshold exceeds the configured threshold.

9. The computer program product of claim 8, wherein query traffic is directed to base shards only.

10. The computer program product of claim 8, wherein IUD traffic is directed to base shards based on the activity threshold being below the configured threshold.

11. The computer program product of claim 8, wherein the plurality of temporary shards and the adaptive index are asynchronously merged into the base shards in a background process when the activity threshold falls below the configured threshold.

12. The computer program product of claim 8, wherein the traffic collected Includes: a most frequently executed IUD operation, patterns/sequences of IUD operations that occur together, and a shard or a group of shards that are accessed together in an IUD operation.

13. The computer program product of claim 8, wherein the traffic is collected using server-based agent software, in-line network collectors, and out-of-band network collectors.

14. The computer program product of claim 8, wherein time spent in calls to user defined functions (UDF) and a number of calls to each UDF are included in the activity calculation.

15. A computer system, comprising:
one or more processors;
a memory coupled to at least one of the processors;
a set of computer program instructions stored in the memory and executed by at least one of the processors in order to perform actions of:
  collecting traffic against a NoSQL database by an activity collector, wherein the collected traffic is analyzed to predict a trend of traffic against the NoSQL database;
  periodically extracting and analyzing by an activity analyzer a database transaction log, wherein the collected traffic and the analyzed database transaction log are input to building a database access pattern, wherein data comprising the database access pattern is stored in an activity database;
  capturing, by a workload analyzer, current traffic and compute an activity threshold;
  for an intensive insert/update/delete (IUD) operation, directing the traffic to a workload processor in response to an activity threshold exceeding a configured threshold;
  based on the activity threshold exceed the configured threshold, generating a plurality of temporary shards, an adaptive key and an adaptive index in the plurality of temporary shards; and
  re-directing the intensive IUD processor traffic to the plurality of temporary shards while the activity threshold exceeds the configured threshold.

16. The computer system of claim 15, wherein query traffic is directed to base shards only.

17. The computer system of claim 15, wherein IUD traffic is directed to base shards based on the activity threshold being below the configured threshold.

18. The computer system of claim 15, wherein the plurality of temporary shards and the adaptive index are asynchronously merged into the base shards in a background process when the activity threshold falls below the configured threshold.

19. The computer system of claim 15, wherein the traffic collected Includes: a most frequently executed IUD operation, patterns/sequences of IUD operations that occur together, and a shard or a group of shards that are accessed together in an IUD operation.

20. The computer system of claim 15, wherein the traffic is collected using server-based agent software, in-line network collectors, and out-of-band network collectors; and
  wherein time spent in calls to user defined functions (UDF) and a number of calls to each UDF are included in the activity calculation.

* * * * *